United States Patent [19]

Katagiri et al.

[11] Patent Number: 5,229,906
[45] Date of Patent: Jul. 20, 1993

[54] MAGNETIC TAPE CASSETTE HAVING PROTRUSIONS OF LOW FRICTION RESIN

[75] Inventors: Shingo Katagiri; Osamu Suzuki, both of Kanagawa, Japan

[73] Assignee: Fuji Photo Film Co., Ltd., Kanagawa, Japan

[21] Appl. No.: 921,972

[22] Filed: Aug. 4, 1992

Related U.S. Application Data

[63] Continuation of Ser. No. 587,874, Sep. 25, 1990, abandoned.

[30] Foreign Application Priority Data

Oct. 12, 1989 [JP] Japan .................... 1-118749[U]

[51] Int. Cl.$^5$ .................... G11B 23/02; G11B 15/32
[52] U.S. Cl. .................... 360/132; 242/199
[58] Field of Search ............ 360/132; 242/198, 199

[56] References Cited

U.S. PATENT DOCUMENTS

| | | | |
|---|---|---|---|
| 3,495,787 | 2/1970 | Wallace | 242/199 |
| 3,565,367 | 2/1971 | Yamamoto | 242/199 |
| 3,675,875 | 7/1972 | Schmidt | 242/199 |
| 4,126,283 | 11/1978 | Kawachi | 242/199 |
| 4,306,663 | 12/1981 | Gelardi et al. | 242/199 |
| 4,466,584 | 8/1984 | Chevalier et al. | 242/199 |
| 4,532,566 | 7/1985 | Horimoto | 360/132 |
| 4,607,306 | 8/1986 | Shirako | 360/132 |

*Primary Examiner*—John H. Wolff
*Attorney, Agent, or Firm*—Sughrue, Mion, Zinn, Macpeak & Seas

[57] ABSTRACT

A magnetic tape cassette in which protrusions made of low friction resin are formed on the inner walls of the upper and lower halves by a two-color molding method in such a manner that they are located in correspondence at least to the magnetic tape winding diameter so as to be in contact with the edges of the magnetic tape. The protrusions of low friction resin replace the friction sheets in the conventional magnetic tape cassette, whereby the number of components and the number of manufacturing steps are reduced, with the result that the manufacturing cost is also reduced.

7 Claims, 2 Drawing Sheets

5,229,906

MAGNETIC TAPE CASSETTE HAVING PROTRUSIONS OF LOW FRICTION RESIN

This is a continuation of application Ser. No. 07/587,874 filed Sep. 25, 1990, now abandoned.

BACKGROUND OF THE INVENTION

The present invention relates to magnetic tape cassettes, and more particularly to the structure of upper and lower halves forming a magnetic tape cassette, which structure contributes to a reduction of the number of components and the number of manufacturing steps of the magnetic tape cassette, and to an improvement of the productivity of the same.

Magnetic tape cassettes are employed as recording and reproducing media in audio devices such as magnetic tape recorders and in video devices such as VTRs. An audio magnetic tape cassette is generally composed of a cassette case made up of upper and lower halves, a pair of hubs rotatably mounted in the cassette case, and a magnetic tape wound on the hubs.

When the magnetic tape cassette is in use, generally the magnetic tape is frequently run and stopped in response to the selection of operating modes: a record mode, a playback mode, a fast forward mode, a stop mode, etc. A flangeless type cassette is provided with friction sheets suitable in surface roughness in order to allow the magnetic tape to run as required. More specifically, the friction sheets are used to suitably tension the magnetic tape while it is being run and to prevent the latter from being slackened in the stop mode.

The friction sheets are thin sheets of soft synthetic resin which are placed on the inner walls of the upper and lower halves. The friction sheets may be embossed, or curled, or prevented from being electrically charged, for instance.

The friction sheets are disadvantageous in the following points:

The friction sheets are placed on the inner surfaces of the upper and lower halves in such a manner that the magnetic tape is held between them. Accordingly, it is necessary to provide two friction sheets per magnetic tape cassette, which increases the number of components of the magnetic tape cassette. In addition, placing the friction sheets inside the cassette case suffers from several difficulties. Specifically, before the upper half is joined with the lower half, the upper friction sheet is placed on the upper half, but it is not substantially fixed to the upper half. Sometimes the upper friction sheet is semi-fixedly bonded to the upper half, that is, it is held unstably on the upper half. The above-described operations of placing the friction sheets are carried out manually or by using an assembling machine. In either case, the operation of semi-fixedly bonding friction sheets to upper and lower halves, or the operation of merely placing friction sheets on upper and lower halves must be carried out. The upper and lower halves on which the friction sheets have been placed must be joined together in such a manner that the friction sheets are in alignment with each other. Accordingly, not only is the number of manufacturing steps increased, but also the number of unacceptable magnetic tape cassettes is increased.

The increase in the number of components and in the number of manufacturing steps has resulted in an increase in manufacturing cost.

SUMMARY OF THE INVENTION

In view of the foregoing, an object of this invention is to provide a magnetic tape cassette in which, instead of friction sheets, a simple structure is employed to tension the magnetic tape suitably and to allow the latter to run as required.

The foregoing object of the invention has been achieved by the provision of a magnetic tape cassette comprising upper and lower halves forming a cassette case, a pair of hubs rotatably supported in the cassette case, and a magnetic tape wound on the hubs in such a manner that the magnetic tape is run freely, in which, according to the invention, protrusions made of low friction resin are formed on the inner walls of the upper and lower halves by two-color molding in such a manner that the protrusions are located in correspondence at least to the magnetic tape winding diameter so as to be in contact with the edges of the magnetic tape.

In the magnetic tape cassette according to the invention, the protrusions are brought into contact with the edges of the magnetic tape. Therefore, by suitably determining the heights of the protrusions and suitably selecting the material for the protrusion, the magnetic tape can be run while being tensioned as required. Thus, with the magnetic tape cassette of the invention, a signal recording or reproducing operation can be performed satisfactorily without the conventional friction sheets. The structure of the magnetic tape cassette of the invention contributes to a reduction of not only the number of components but also the number of manufacturing steps.

DESCRIPTION OF THE PREFERRED EMBODIMENTS

An example of a magnetic tape cassette constructed according to the present invention will be described with reference to the accompanying drawings.

Figure 1:
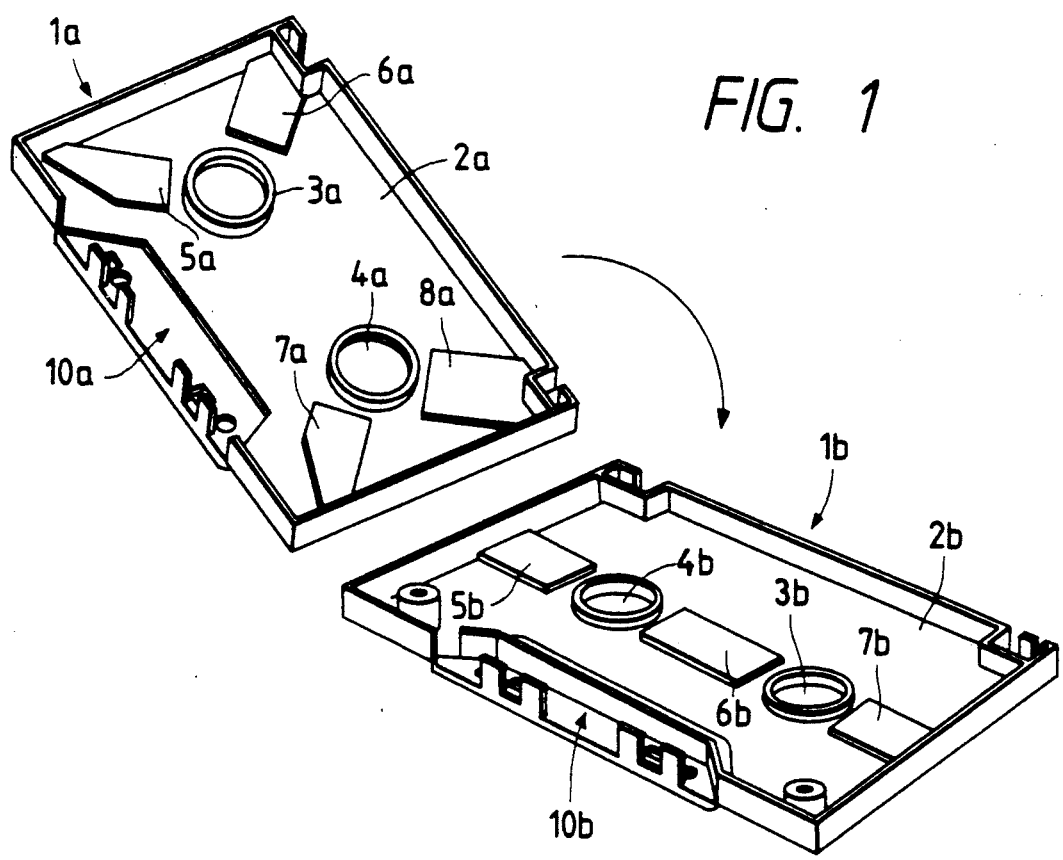
FIG. 1 is a perspective view showing the upper and lower halves of an example of a magnetic tape cassette according to the invention.
Figure 2:
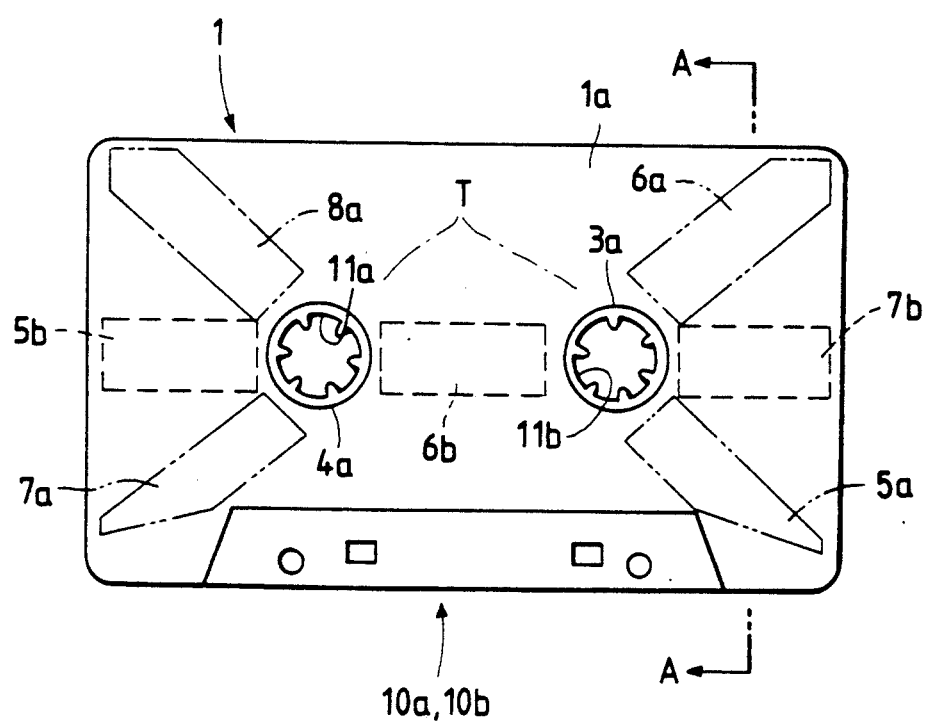
FIG. 2 is a plan view of the magnetic tape cassette according to the invention.
Figure 3:
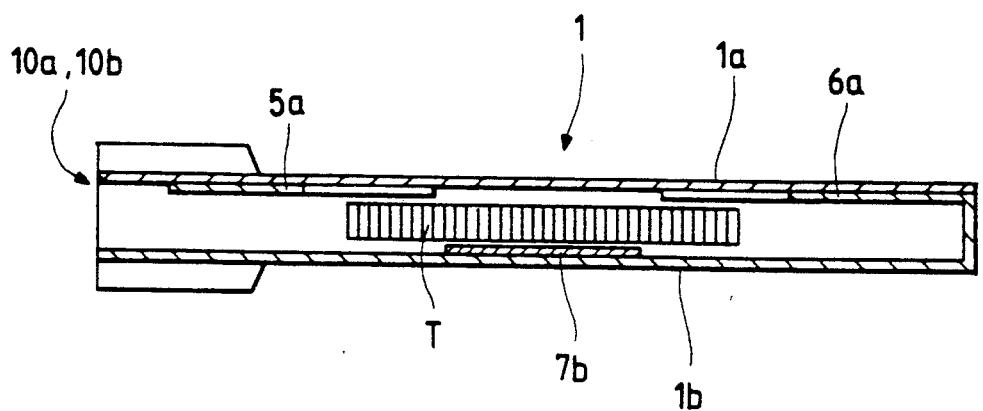
FIG. 3 is a sectional diagram as viewed in the direction of the arrow A—A in FIG. 2.
Figure 4:
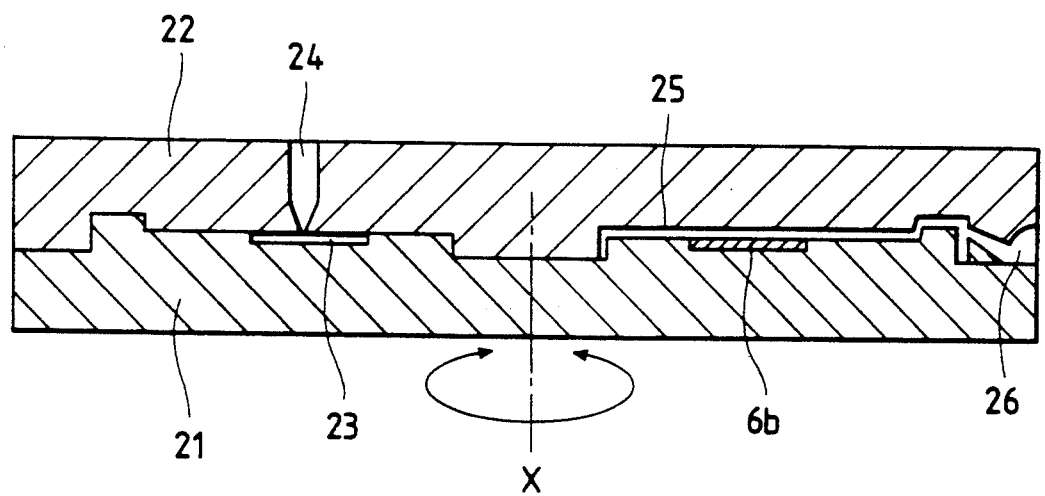
FIG. 4 is a sectional view of a two-color molding metal mold.

FIG. 1 is a perspective view showing the upper and lower halves of the magnetic tape cassette. FIG. 2 is a plan view of the magnetic tape cassette. FIG. 3 is a sectional diagram as viewed in the direction of the arrow A—A in FIG. 2, showing the contact of protrusions and the edges of the magnetic tape. FIG. 4 is a diagram showing a two-color molding metal mold.

First, the structure of the upper and lower halves will be described with reference to FIG. 1.

A pair of hub holes 3a and 4a are formed in the flat plate part 2a of the upper half 1a according to standard practice. Protrusions 5a and 6a are formed on the inner wall of the upper half 1a extending from the two cassette corners closer to the hub hole 3a towards the latter with spaces between the hub holes and the protrusions. Similarly, protrusion 7a and 8a are formed on the inner wall of the upper half 1a extending from the remaining two cassette corners closer to the other hub hole 4a towards the latter with spaces between the hub hole 4a and the protrusions.

On the other hand, a pair of hub holes 3b and 4b are formed in the flat plate parts 2b. Three protrusions 5b, 6b and 7b are formed on the inner wall of the lower half 1b lying along a line passing through the centers of the hub holes 3b and 4b and spaced from the latter. Furthermore, it should be noted that the protrusions 5b, 6b and 7b are not aligned with the protrusions 5a, 6a, 7a and 8a of the upper half when the upper and lower halves are joined together. The upper and lower halves 1a and 1b have trapezoidal parts 10a and 10b, respectively, in the recording and reproducing region of the cassette, which form the front opening of the cassette when the cassette is assembled and into which the magnetic head is inserted.

The assembled magnetic tape cassette 1 will be described with reference to FIG. 2.

Similarly as in the conventional magnetic tape cassette, a pair of hubs 11a and 11b are rotatably supported by annular protrusions defining the above-described hub holes 3a, 3b, 4a and 4b, and the magnetic tape T is wound on the hubs in such a manner that it is run freely passing through the recording and reproducing region. The lower edge of the magnetic tape T is brought into contact with the protrusions 5b through 7b, as indicated by dotted lines, and the upper edge thereof is confronted with the protrusions 5a through 8a, as indicated by one-dot chain lines. That is, as shown in FIG. 3, which is a sectional view taken along line A—A in FIG. 2, the magnetic tape T is held between the protrusion 7b of the lower half and the protrusions 6a and 7a of the upper half, which are arranged in staggered fashion.

The protrusions are alternately confronted with the magnetic tape from above and below, and therefore they can protrude towards the magnetic tape as much as permitted by standard specifications. Hence, when the magnetic tape is run or held stopped, the magnetic tape is suitably held or guided through its upper and lower edge by the protrusions formed on the upper and lower halves. Thus, in the magnetic tape cassette of the invention, unlike the conventional cassette, although having no friction sheets, the magnetic tape is run stably and is suitably tensioned. Accordingly, the magnetic tape is prevented from being slackened, and is precisely wound on the hubs at all times.

The configurations of the above-described protrusions will be described with reference to FIG. 4. These protrusions are formed at the same time. However, for convenience in illustration and in description, formation of only the protrusion 7b and the lower half 1b will be described.

It is preferable that the upper and lower halves 1a and 1b with the protrusions be formed by a so-called "two-color" molding process. In the two-color molding method, a metal mold as shown in FIG. 4 may be employed. The metal mold has a lower part 21 rotatable around the axis X, and a upper part 22 movable vertically.

The lower part 21 has a cavity 23 used to form the protrusion 6b, and the cavity 23 is communicated with a synthetic resin injecting gate 24.

The protrusion 6b is formed as follows: A synthetic resin high in wear resistance and low in friction is injected through the gate 14 into the cavity 23, as indicated on the left of the axis X. After a predetermined quantity of synthetic resin has been injected into the cavity, the upper part 22 of the metal mold is moved upwardly, and then the lower part 21 is turned 180° to position the protrusion 6b thus formed on the right of the axis X.

Under this condition, the upper part 22 is moved down to the lower part 21 so that a cavity 25 for forming the lower half body 1b is formed over the protrusion 6b. Thereafter, a synthetic resin such as ABS resin employed for formation of the conventional cassette case is injected into the cavity 25 through a gate 26 communicated with the latter so that the lower half 2b is integral with the protrusion 6b.

The other protrusions 5b and 7b are formed on the lower half 1b in the same manner.

As is apparent from the above description, according to the two-color molding method, the protrusions and the upper and lower halves can be made of synthetic resins different in characteristic with ease. The method is suitable for the case where it is necessary to form the protrusions with material such as hard synthetic resin which is different from the material of the upper and lower halves 1a and 1b.

The outer flat surfaces of the protrusions, namely, the contact surfaces of the protrusions, are frequently brought into contact with the edges of the magnetic tape. That is, the contact surfaces of the protrusions are rubbed by the edges of the magnetic tape. If the protrusions are made of soft material, they will be scraped by the edges of the magnetic tape, thus forming scrapings. If the scrapings stick to the recording or reproducing surface of the magnetic tape, then signal drop-out may occur. However, in the magnetic tape cassette according to the invention, the protrusions are formed with hard synthetic resin low in friction according to the two-color molding method as described above, which prevents the occurrence of the above-described difficulty and thus improves the reliability of the product.

While a preferred embodiment of the invention has been described, it should be noted that the invention is not limited thereto or thereby. That is, the embodiment may be changed or modified in various manners.

For instance, the configurations and positions of the protrusions 5a through 8a and 5b through 7b are not limited to those which have been described above. Each of the protrusions may be formed with a number of smaller protrusions.

Furthermore, the contact surface of each of the protrusions may be gently curved.

The contact surfaces of the protrusions may be in the forms of characters or patterns. With transparent magnetic tape cassettes available lately, the protrusions may be utilized for aesthetic improvement of the design. For instance, the protrusions 5b through 7b may be so formed as to be used as gradations 6bb indicating the amounts of winding of the magnetic tape.

As described above, in the magnetic tape cassette according to the invention, the protrusions are made of low friction resin on the inner walls of the upper and lower halves by the two-color molding method in such a manner that they are located in correspondence at least to the magnetic tape winding diameter so as to be in contact with the edges of the magnetic tape. The protrusions of low friction resin replace the friction sheets in the conventional magnetic tape cassette, whereby the number of components and the number of manufacturing steps are reduced with the result that the manufacturing cost is also reduced.

What is claimed is:

1. In a magnetic tape cassette comprising upper and lower halves forming a cassette case, a pair of hubs adapted to be rotatably supported by said cassette case, and a magnetic tape wound on said hubs, the improvement comprising protrusions made of low friction resin formed on inner walls of said upper and lower halves, said protrusions being located in correspondence to a winding diameter of said magnetic tape as wound on said hubs so as to be in contact with edges of said magnetic tape, said protrusions on said upper half having a width substantially greater than a height thereof and extending respectively from each of the four corners of said upper half, and said protrusions on said lower half comprising protrusions aligned along a line passing through a center point of said lower half and centers of both hub holes of said cassette in the plane of said lower half.

2. The magnetic tape cassette of claim 1, wherein said protrusions are formed by two-color molding.

3. A tape cassette for holding a tape, comprising:
    hubs around which said tape is wound;
    a first cassette half having a first inner wall, said first cassette half including
    first hub holes for receiving said hubs; and
    first protrusions formed on said first inner wall and extending inwardly from each of the four corners of said first cassette half; and
    a second cassette half having a second inner wall, said first and second cassette halves forming a cassette case, said second cassette half including
    second hub holes for receiving said hubs; and
    second protrusions formed on said second inner wall and aligned along a line passing through a center point of said second cassette half and centers of both said first and second hub holes in the plane of said second cassette half, said first and second protrusions each having a width substantially greater than a height thereof.

4. A tape cassette as recited in claim 3, wherein said first protrusions are integrally formed with the inner wall of said first half, and said second protrusions are integrally formed with the inner wall of said second half.

5. A tape cassette as recited in claim 3, wherein said first protrusions contact edges of a first side of the tape wound on said hubs, and said second protrusions contact edges of a second side of the tape wound on said hubs.

6. A tape cassette as recited in claim 3, wherein said first and second protrusions are formed of low friction resin.

7. In a magnetic tape cassette comprising upper and lower halves forming a cassette case, a pair of hubs adapted to be rotatably supported by said cassette case, and a magnetic tape wound on said hubs, the improvement comprising protrusions made of low friction resin formed on inner walls of said upper and lower halves, said protrusions being located in correspondence to a winding diameter of said magnetic tape as wound on said hubs so as to be in contact with edges of said magnetic tape, said protrusions on said lower half comprising protrusions at each of the four corners of said lower half, and said protrusions on said upper half comprising protrusions having a width substantially greater than a height thereof and aligned along a line passing through a center point of said upper half and centers of both hub holes of said cassette in the plane of said upper half.

* * * * *